United States Patent [19]

Tonti et al.

[11] Patent Number: 4,940,773

[45] Date of Patent: Jul. 10, 1990

[54] PROCESS FOR PRODUCING MODIFIED, IMPACT-RESISTANT POLYAMIDES WITH LACTAM-BLOCKED DIISOCYANATE/MONOISOCYANATE

[75] Inventors: Sergio Tonti, Venice; Piero Furlan, Treviso; Gianpietro Talamini, Venice, all of Italy

[73] Assignee: Montedipe S.p.A., Milan, Italy

[21] Appl. No.: 377,964

[22] Filed: Jul. 11, 1989

[30] Foreign Application Priority Data

Jul. 11, 1988 [IT] Italy .................................. 21309 A/88

[51] Int. Cl.⁵ .............................................. C08G 69/20
[52] U.S. Cl. ..................................... 528/315; 528/323
[58] Field of Search ......................... 528/315, 312, 323

[56] References Cited

U.S. PATENT DOCUMENTS 3,671,501 6/1972 Johnson ............................... 528/315
4,191,819 3/1980 Meyer et al. ......................... 528/315
4,490,520 12/1984 Ogasa et al. ......................... 528/315
4,626,385 12/1986 Ashida et al. ........................ 528/315

FOREIGN PATENT DOCUMENTS 0631471 8/1982 Switzerland ........................ 528/315

Primary Examiner—Harold D. Anderson
Attorney, Agent, or Firm—Stevens, Davis, Miller & Mosher

[57] ABSTRACT

A process for producing modified, impact-resistant polyamides showing an increased polymerization rate, which consists in polymerizing an ω-lactam in the presence of:

(a) a mixture of an organic di-isocyanate and an organic mono-isocyanate, the isocyanate groups of both of which are blocked with an ω-lactam;
(b) a poly-oxy-alkylene-amine having an aminic functionality lower than 3, and
(c) an alkaline catalyst.

20 Claims, No Drawings

PROCESS FOR PRODUCING MODIFIED, IMPACT-RESISTANT POLYAMIDES WITH LACTAM-BLOCKED DIISOCYANATE/MONOISOCYANATE

DESCRIPTION OF THE INVENTION

The present invention relates to a process for preparing modified polyamides endowed with an increased polymerization rate, by anionic polymerization of ω-lactams.

It is known in the art that the anionic polymerization of the lactams, which can take place by means of an alkali metal, can be speeded up by means of an activator. A large number of compounds have been used as activators for the anionic polymerization of lactams and, among these, were nitrogenous compounds such as, e.g., acyl-lactams, substituted triazines, carbo-diimides, cyanamides, isocyanates. Both monofunctional and polyfunctional activators can be used.

It is known that the polyfunctional activators make it possible for higher molecular weights and for partially crosslinked products to be obtained.

The polyamides obtained according to this process display good characteristics of mechanical strength, such as a high tensile strength under traction, a high bending resistance, and a high initial coefficient at traction, and such polyamides are used as machine parts and as industrial materials.

However, these polyamides have the drawback that they show a low elongation strength and a low impact strength and are hard and fragile. These polyamides therefore cannot be used in those fields in which a plastic character is required. Furthermore, their polymerization rate is not high enough, and above all are not very suitable for injection-molding processes (RIM technology).

Several proposals have been made heretofore in an effort to improve the elongation strength and the impact strength of polyamides obtained by alkaline polymerization of ω-lactams and/or their polymerization rate.

For example, U.S. Pat. No. 4,596,865 discloses a process for preparing a block copolymer of the type of nylon 6 by starting from ε-caprolactam, in which the polymerization rate of ε-caprolactam is increased by the addition of compounds of 2-oxo-1-pyrrolidinyl to the reaction mixture.

EP-A-0,204,118 discloses the reaction of already-formed polyamides (possibly also partially crystalline) with mono-isocyanates and their precursors, resulting in products showing improved rheologic properties, a better impact strength, and an easier release from the mold.

The purpose of the present invention is to provide a process for preparing, for injection-molding processes (RIM), a polyamide endowed with a high impact strength and a sufficiently high elastic modulus at bending, as well as with a high polymerization rate.

Such polyamides may be prepared by a process consisting or consisting essentially in polymerizing an ω-lactam in the presence of:
 (a) a mixture of a di-isocyanate and a mono-isocyanate, the isocyanate groups of both of which are blocked with an ω-lactam;
 (b) a poly-oxy-alkylene-amine having an aminic, or amine, functionality lower than 3, and
 (c) an alkaline catalyst.

The addition to the reaction mixture of mono-isocyanates and their precursors having their isocyanate group blocked with an ω-lactam makes it possible to decrease the polymerization time of the ω-lactam by about 50%.

The poly-oxy-alkylene-amines according to the present invention have an aminic functionality lower than 3, and preferably within the range from 1.5 to 2.9.

Such poly-oxy-alkylene-amines may be prepared according to known methods, such as, e.g., by amination with ammonia of the corresponding hydroxy-polyethers, but they can also be directly found on the market.

Particularly preferred for the purposes of the present invention are the poly-oxy-propylene-diamines and poly-oxy-tetramethylene-diamine, and still more preferably the poly-oxy-propylene-diamines having a molecular weight within the range from about 200 to about 4,000, such as, e.g., those marketed under the trade names of JEFFAMINE® D 2000 and JEFFAMINE® D 4000.

Also useful for the purpose of this invention are the poly- oxy-propylene-amines having an aminic functionality of about 2.5 and a molecular weight of about 5000, which are marketed under the trade name of JEFFAMINE® T 5000. These commercial products are traded by Texaco Chemical Company.

The poly-oxy-alkylene-amines according to the present invention are preferably used in amounts within the range from 1% to 40%, and preferably from 5% to 30% by weight, with reference to the total amount of the reactants.

The ω-lactams used in the present invention may be selected from the following compounds: γ-butyro-lactam, δ-valero-lactam, ε-capro-lactam, ω-enantho-lactam, ω-capryllactam, ω-undecano-lactam and ω-lauryl-lactam taken alone or in combination. ε-Caprolactam and ω-lauryl-lactam are particularly preferred.

For the anionic polymerization of the ω-lactams, several types of catalysts are known and used in the usual catalytic amounts, such as lactamates, alkoholates, hydrides of alkali metals and of alkali-earth metals; however, sodium, potassium, bromo-magnesium lactamates, normally dissolved in the ω-lactam, are preferably used. A solution containing 15–25% by weight of sodium or potassium lactamate in an ω-lactam is preferred in the process according to the present invention.

The amount of catalyst may range from 0.2 to 2 mol per each 100 mols of ω-lactam, and preferably from 0.25 to 1.5 mol per each 100 mols of ω-lactam.

As activators of the anionic polymerization of ω-lactam, isocyanates are used, the isocyanate groups of which are blocked with an ω-lactam of the types hereinabove disclosed, obtained according the per se known methods.

The di-isocyanates suitable for the intended purpose may be aliphatic, cycloaliphatic and aromatic di-isocyanates, such as:
hexamethylene-di-isocyanate (HDI)
2,2,4-trimethyl-hexamethylene-1,6-di-isocyanate (TMDI)
the tri-mers of hexamethylene-di-isocyanate
para-phenylene-di-isocyanate (PPDI)
benzene-1,3-di-isocyanate
toluene-di-iso-cyanate (TDI)
1,1',-methylene-bis-(4-isocyanato-benzene) MDI and its polymers (PMDI)
naphthalene-1,5-di-isocyanate (NDI)

1,4-cyclohexane-di-isocyanate (CHDI)
1,4-bis-(isocyanato-methyl)-cyclohexane (LDI)
1,3-bis-(isocyanato-methyl)-cyclohexane (H$_6$XDI)
isophorone-di-isocyanate
1,1'-methylene-bis-(4-isocyanato-cyclohexane)(hydrogenated MDI)
1,1'-diphenyl-4,4'-di-isocyanate-3,3'-dimethyl
2,2,4,4tetramethyl-hexane-1,6-di-isocyanate
1,3-bis-(isocyanato-methyl)-benzene
1,6-cyclohexane-di-isocyanate
4,4'-di-isocynato-3,3'-dimethoxy-1,1'-diphenyl; and, 5-isocyanato-1-(isocyanatomethyl)-1,3,3-trimethyl-cyclohexane
and so forth, and their mixtures.

The mono-isocyanates suitable for the purpsoe according to the present invetnion are the aliphatic, cycloaliphatic or aromatic mono-isocyanates containing from 1 to 20 carbon atoms, such as:
methyl-isocyanate
propyl-isocyanate
isopropyl-isocyanate
n-butyl-isocyanate
hexyl-isocyanate
cyclohexyl-isocyanate
6-chloro-hexyl-isocyanate
n-octyl-iso-cyanate
2-ethyl-hexyl-isocyanate
2,3,4-trimethyl-cyclohexyl-isocyanate
3,3,5-trimethyl-cyclohexyl-isocyanate
2-norbornyl-methyl-isocyanate
decyl-isocyanate
dodecyl-isocyanate
tetradecyl-isocyanate
hexadecyl-isocyanate
octadecyl-isocyanate
2-butoxy-propyl-isocyanate
3-(2-ethyl-hexyl-oxy)-propyl-isocyanate
phenyl-isocyanate
toluyl-isocyanate
the chlorophenyl-isocyanates (the 2-, 3- and 4-isomers)
4-nitrophenyl-isocyanate
3-trifluoromethyl-phenyl-isocyanate
benzyl-isocyanate
dimethyl-phenyl-isocyanate (the technical mixture and the individual isomers)
dichloro-phenyl-isocyanate (the technical mixture and the individual isomers)
4-dodecyl-phenyl-isocyanate
4-cyclohexyl-phenyl-isocyanate
1-naphthyl-isocyanate; and,
isocyanato-amides dervied from 1 mol of a di-isocyanate and mol of a monocarboxy acid, preferably from toluene-di-isocyanate, dipheny-methane di-isocyanate and hexamethylene-di-isocyanate and aliphatic monocarboxy acids having at elast 6 carbon atoms, and so forth; and their mixtures.

In the practice of the present invention, the monoisocyanate is introduced into the reaction mixture in the form of a mixture with the di-isocyanate.

The proportions of the mono-isocyanate and of the di-isocyanate in this mixture are such that per each 10 equivalents of —NCO, from 3 to 9.5 and preferably from 6 to 9.5 —NCO equivalents are contributed by the di-isocyanate, and from 0.5 to 7, preferably from 0.5 to 4 —NCO equivalents are contributed by the mono-isocyanate.

Preferably, a variable amount of a mixture of hexamethylene-di-isocyanate (HDI) and of octadecyl-isocyanate is used, so that the concentration of the —NCO active groups is within the range from 0.2 to 10, and preferably from 1 to 7, equivalents per each 100 mols of lactam.

The amount of the mixture of the activator (the di-isocyanate) and of the promoter of the polymerization rate (the mono-isocyanate) to be used is proportional to the amount of poly-oxy-alkylene-amine used, and is such that the total concentration of the active function (the total number of —NCO equivalents) is at least equal to the total concentration of the —NH$_2$ groups present in the system.

In general, the ratio of the total number of —NCO equivalents to the number of —NH$_2$ equivalents is higher than 1, and is preferably within the range from 1.05 to 2.

As a function of the ratio of the mixture of monoisocyanate and of di-isocyanate to the modifier (the poly-oxy-alkylene-amine) and of the operating conditions used, a copolymer having a repetitive block structure (polyamide 6 and elastomeric segment), or a mixture of homopolymer and copolymer with alternating repetitive segments may be obtained.

When the NCO/NH$_2$ ratio is higher than 1, experimental tests demonstrate that an improvement occurs in the physical-mechanical properties of the resulting copolymer.

With a ratio higher than 1.5, an impact strength is obtained which is decidedly higher than that of the polyamide homopolymer (with 20% of JEF-FAMINE$^{(R)}$ D 2000 the value of Izod resilience with notch is within the range from 60 to 500 J/m) without any substantial decreases in the value of the elastic modulus at bending (>1000 MPa).

In general, the products obtained by the process according to the present invention are endowed with very good color characteristics, in that they show a yellow index, as determined according to ASTM D 1925-70, not higher than —15.

Furthermore, as mentioned above, an important, surprising and unexpected feature of the present invention is that the presence of mono-isocyanate in admixture with the di-isocyanate makes it possible, with all of the other conditions being the same, to increase the reaction rate as compared to the corresponding polyamide in which, instead of the mixture, only di-isocyanate is used as the activator, hence with the possibility of being able to Open the mold after considerably shorter times.

In the practical embodiment of the present invention, it is preferred that the components of the formulation be mixed with one another and then melted for charging into the mold within which the polymerization takes place.

The components are preferably distributed between two melting tanks, one of which contains a portion of the ω-lactam and the activator, and the other of which contains the residual ω-lactam and the catalyst.

The poly-oxy-alkylene-amine may be indifferently charged to either tank, according to the preferred methods of practical embodiment of the process as disclosed in the following.

In the first method, the mixture of the isocyanates with their isocyanate groups blocked, the ω-lactam, and the poly-oxy-alkylene-amine are mixed and melted at a temperature not higher than 110° C., and to the thus-obtained mixture the catalyst in molten ω-lactam is added. The polymerization temperature is then increased up to a value not lower than 120° C.

In the second method, to the mixture of the isocyanates with their isocyanate groups blocked and dissolved in molten ω-lactam, a mixture of the poly-oxyalkylene-amine with the molten ω-lactam and the alkaline catalyst is added at a temperature not higher than 110° C. The polymerization temperature is then increased up to a value not lower than 120° C.

The melting temperature may be within the range from 75° up to 110° C.

The two streams leaving the tanks are metered by means of a suitable metering instrument, are mixed with each other in the desired proportions, and are then fed to the mold. The polymerization takes place inside the same mold at a temperature within the range from 120° to 250° C. and more preferably from 130° to 160° C., within a few minutes. If the process is carried out at a temperature lower than the polyamide softening temperature, the formed polymer may be easily removed from the mold already as a finished article.

The polymerization process may be carried out in the presence of such reinforcing agents as fiberglass of various sizes, fabrics, mineral fillers behaving as inert substances and not interfering with the polymerization, etc.

The use of fiberglass ma be advantageous when the stiffness of the manufactured article is to be increased.

The present formulations are particularly suitable for obtaining a wide range of manufactured shaped articles, such as flat sheets of various thicknesses, semifinished articles, massive objects of various shapes, rods, tubes, vessels, and various articles in general.

In particular, the present formulations are suitable for obtaining flat parts, or at least parts with a large linear dimension, of car bodyworks, by means of the RIM (Reaction Injection Molding) technology or rotational molding.

Some illustrative examples follow which in no way ar limitative of the invention, in order still better to understand said invention and to practice it.

EXAMPLE 1

Inside a jacketed tank heated at 90° C., equipped with stirring means and with bottom drain means, 213 g of ε-caprolactam (CPL) and 21.5 g of catalyst [Na caprolactamate (Na-CPL) at 20% in CPL]were melted under a nitrogen atmosphere. When the temperature of 90° C. was reached, always under nitrogen atmosphere, 15.5 of activator (consisting of 10 g of caprolactam-blocked hexamethylene-di-isocyanate at 33% in caprolactam, and 5.5 g of caprolactam-blocked octadecyl-isocyanate at 25% in caprolactam) was added to the mixture, and 2 minutes later a flat mold of 210×210×3.5 mm, preheated at 156° C., was filled.

After 1 minute and 30 seconds the mixture polymerized and the mold was opened.

A polymer was obtained, which showed an impact strength (Izod method with notch according to ASTM D 256) at 23° C. of 24 J/m, and an elastic modulus at bending (ASTM D 790) of 3,212 MPa, as determined on the dry product.

EXAMPLE 2

Example 1 was repeated with only the proportions of the components being varied, while the total amount of said components was kept fixed (250 g). The compositions of the formulations used, the times and conditions of polymerization, and the characteristic of the polymer are reported below in Table 1.

EXAMPLE 3

Inside a jacketed tank heated at 90C, equipped with stirring means and with bottom drain means 160 g of ε-caprolactam (RPL), 15 g of catalyst [Na caprolactamate (Na-CPL) at 20% in CPL]and 50 g of JEFFAMINE ® 2000 were melted under a nitrogen atmosphere.

When the temperature of 90° C. was reached, still under nitrogen atmosphere, 25 g of activator (consisting of 20.75 g of caprolactam-blocked hexamethylene-di-isocyanate at 33% in caprolactam, and 4.25 g of caprolactam-blocked octadecyl-isocyanate at 25% in caprolactam) was added to the mixture, and 2 minutes later a flat mold of 210×210×3.5 mm, preheated at 156° C., was filled.

After 2 minutes and 30 seconds the mixture polymerized and the mold was opened.

A polymer was obtained, which showed an impact strength (Izod method with notch according to ASTM D 256) at 23° C. of 167 J/m, and an elastic modulus at bending (ASTM D 790) of 1,323 MPa, as determined on the dry product.

EXAMPLE 4–8 AND COMPARATIVE EXAMPLES

Example 3 was repeated, with different reaction parameters, as well as varying proportions of the reactants, but taking care that the total amount of the reactants always equaled 250 g.

The Comparative Example 1 relates to a composition of reactants not containing JEFFAMINE ® D 2000 and in which the activator consists of hexamethylene-di-isocyanate alone.

The Comparative Example 2, on the contrary, relates to a composition also containing the modifier (JEFFAMINE ® D 2000).

The compositions of the formulations used, the polymerization times, and the mechanical characteristics of the polymer are summarized in Table 1.

TABLE 1

| EXAMPLES | | 1 | 2 | 3 | 4 | 5 | 6 | 7 | 8 | Comparative Example 1 | Comparative Example 2 |
|---|---|---|---|---|---|---|---|---|---|---|---|
| Caprolactam (CPL) | % by weight | 85.1 | 83.4 | 64 | 62.9 | 64 | 62.9 | 69 | 69 | 86.8 | 65.3 |
| Na-CPL (at 20% in CPL) | % by weight | 8.7 | 8.7 | 5 | 6 | 6 | 6 | 6.7 | 5.7 | 8.7 | 6 |
| Activator (HDI at 33% in CPL)* | % by weight | 4 | 3.7 | 8.3 | 7.8 | 8.3 | 7.8 | 4.3 | 4.3 | 4.5 | 8.7 |
| Activator ($C_{18}H_{37}NCO$ at 25% in CPL) (**) | % by weight | 2.2 | 4.2 | 1.7 | 3.3 | 1.7 | 3.3 | 10 | 10 | — | — |
| JEFFAMINE D 2000 (functionality 1.9) | % by weight | — | — | 20 | 20 | 20 | 20 | 10 | 10 | — | 20 |
| Mixer temperature | °C. | 90 | 90 | 90 | 90 | 90 | 90 | 90 | 90 | 90 | 90 |
| Mold temperature | °C. | 150 | 150 | 140 | 140 | 150 | 150 | 140 | 150 | 150 | 150 |
| Mold opening time | | 1 m 30 s | 1 m 20 s | 2 m 30 s | 2 m 20 s | 2 m 30 s | 2 m | 2 m | 2 m | 3 m 30 s | 3 m |
| Impact strength, IZOD Method | J/m | 24.0 | 24.0 | 167 | 162 | 551 | 242 | 58 | 63 | 24 | 727 |

TABLE 1-continued

| EXAMPLES | | 1 | 2 | 3 | 4 | 5 | 6 | 7 | 8 | Comparative Example 1 | Comparative Example 2 |
|---|---|---|---|---|---|---|---|---|---|---|---|
| with notch on dry product at +23° C., ASTM D 256 | | | | | | | | | | | |
| Elastic modulus at bending on dry product ASTM D 790 | MPa | 3212 | 3145 | 1353 | 1277 | 1323 | 1407 | 2352 | 2369 | 3327 | 1083 |

(*)The concentration relates to HDI wit non-blocked isocyanic groups.
(**)The concentration relates to $C_{18}H_{37}NCO$ with non-blocked isocyanic groups.

What is claimed is:

1. Process for preparing an impact-resistant polyamide endowed with a high polymerization rate, consisting essentially in polymerizing an ω-lactam in the presence of:
   (a) a mixture of a di-isocyanate and a monoisocyanate, the isocyanate groups of both of which are blocked with an ω-lactam;
   (b) a poly-oxy-alkylene-amine having an amine functionality lower than 3, and
   (c) an alkaline catalyst.

2. Process according to claim 1, characterized in that the mixture of the isocyanates with blocked isocyanate groups, the ω-lactam, and the poly-oxy-alkylene-amine are mixed and melted at a temperature not higher than 110° C., and the alkaline catalyst in molten ω-lactam is added to the so-obtained mixture, the polymerization temperature being then increased up to a value not lower than 120° C.

3. Process according to claim 1, characterized in that a mixture of the poly-oxy-alkylene-amine with the molten ω-lactam and the alkaline catalyst is added to the mixture of the isocyanates with blocked isocyanate groups dissolved in molten ω-lactam, at a temperature not higher than 110° C., and the polymerization temperature is then increased up to a value not lower than 120° C.

4. Process according to claim 1, 2 or 3, in which the mixing temperature is within the range from 75° to 100° C., and the polymerization temperature is within the range from 120° to 250° C.

5. Process according to claim 1, 2 or 3, in which the mixing temperature is within the range from 75° to 100° C., and the polymerization temperature is within the range from 130° to 160° C.

6. Process according to claim 1, 2 or 3, in which the poly-oxy-alkylene-amine has an amine functionality within the range from 1.5 to 2.9.

7. Process according to claim 1, 2 or 3, in which the poly-oxy-alkylene-amine is a poly-oxy-propylene-diamine or a poly-oxy-tetramethylene-diamine.

8. Process according to claim 6 in which the poly-oxy-propylene-diamine has a molecular weight within the range from bout 200 to about 5,000.

9. Process according to claim 1, 2 or 3, in which the amount of poly-oxy-alkylene-amine is within the range from 1% to 40% by weight, with reference to the total amount of the reactants.

10. Process according to claim 1, 2 or 3, in which the amount of poly-oxy-alkylene-amine is within the range from 5% to 30% by weight, with reference to the total amount of the reactants.

11. Process according to claim 1, 2 or 3, in which the ω-lactam is selected from the group consisting of γ-butyro-lactam, δ-valero-lactam, ε-capro-lactam, ω-enantho-lactam, capryl-lactam, ω-undecano-lactam and ω-lauryl-lactam, taken either alone or in combination.

12. Process according to claim 1, 2 or 3, in which the ω-lactam is ε-capro-lactam and ω-lauryl-lactam.

13. Process according to claim 1, 2 or 3, in which the di-isocyanate is an aliphatic di-isocyanate, a cycloaliphatic di-isocyanate or an aromatic di-isocyanate.

14. Process according to claim 13 in which the di-isocyanate is hexamethylene-di-isocyanate (MDI) or trimethyl-hexamethylene-di-isocyanate (TMDI).

15. Process according to claim 11 in which the di-isocyanate is a mixture of an aliphatic di-isocyanate and an aromatic di-isocyanate.

16. Process according to claim 1, 2 or 3, in which the mono-isocyanate is an aliphatic mono-isocyanate containing from 1 to 20 carbon atoms.

17. Process according to claim 1, 2 or 3, in which the mono-isocyanate is octadecyl-isocyanate.

18. Process according to claim 1, 2 or 3, characterized in that the mono-isocyanate and the di-isocyanate are contained in the mixture in such proportions that per each 10 equivalents of —NCO from 3 to 9.5 equivalents of —NCO are contributed by the di-isocyanate, and from 0.5 to 7 equivalents of —NCO are contributed by the mono-isocyanate.

19. Process according to claim 1, 2 or 3, characterized in that the mono-isocyanate and the di-isocyanate are contained in the mixture in such proportions that per each 10 equivalents of —NCO, from 6 to 9.5 equivalents of -NCO are contributed by the di-isocyanate, and from 0.5 to 4 equivalents of —NCO are contributed by the mono-isocyanate.

20. Polyamide when obtained by the polymerization of an ω-lactam in the presence of:
   (a) a mixture of a di-isocyanate and a monoisocyanate, the isocyanate groups of both of which are blocked with an ω-lactam;
   (b) a poly-oxy-alkylene-amine having an amine functionality lower than 3, and
   (c) an alkaline catalyst.

* * * * *